United States Patent [19]

Peters et al.

[11] Patent Number: 4,834,877

[45] Date of Patent: May 30, 1989

[54] APPARATUS FOR MEMBRANE-PERMEATION SEPARATIONS USING SEGMENTED FLOW

[75] Inventors: Thomas L. Peters; Timothy S. Stevens, both of Midland, Mich.

[73] Assignee: The Dow Chemical Company, Midland, Mich.

[21] Appl. No.: 213,030

[22] Filed: Jun. 28, 1988

Related U.S. Application Data

[60] Continuation of Ser. No. 43,512, Apr. 28, 1987, abandoned, which is a division of Ser. No. 764,268, Aug. 9, 1985, Pat. No. 4,684,470.

[51] Int. Cl.$^4$ ............................................. B01D 13/01
[52] U.S. Cl. .................................. 210/198.1; 210/295; 210/296; 210/321.8; 210/321.89; 210/456; 210/500.23; 55/158
[58] Field of Search ............... 210/639, 640, 198.1, 210/205, 295, 296, 321.8, 321.89, 321.81, 321.9, 456, 500.23, 644, 649; 55/158

[56] References Cited

U.S. PATENT DOCUMENTS

| | | | |
|---|---|---|---|
| 2,933,293 | 4/1960 | Ferrari | 422/198 |
| 3,228,876 | 1/1966 | Mahon | 210/638 |
| 3,457,170 | 7/1969 | Havens | 210/490 |
| 3,503,515 | 3/1970 | Tomsic | 210/321 |
| 3,912,624 | 10/1975 | Jennings | 210/636 |
| 3,963,622 | 6/1976 | Baudet | 210/321.5 |
| 3,989,626 | 11/1976 | Bentley | 210/177 |
| 3,992,301 | 11/1976 | Shippey | 210/96.2 |
| 4,141,687 | 2/1979 | Forrest | 422/82 |
| 4,219,426 | 8/1980 | Spekie | 210/232 |
| 4,474,664 | 10/1984 | Stevens | 210/656 |
| 4,529,521 | 7/1985 | Cortes | 210/644 |

OTHER PUBLICATIONS

1983 Fisher Scientific Catalog, copyright Oct. 1982, Fisher Scientific Co. page 460.
Stevens et al., "Packed Hollow Fiber Suppressors For Ion Chromatography," Analytical Chemistry, vol. 54, No. 7, pp. 1206-1208 June 1982.
Ruzicka, Flow Injection Analysis, John Wiley & Sons, N.Y., pp. 8-13, June 1981.
Hwang, Techniques of Chemistry, vol. VII, "Membranes in Separations", Robert E. Krieger Publishing Co., Florida, June 1984.

Primary Examiner—Ernest G. Therkorn
Attorney, Agent, or Firm—Timothy S. Stevens

[57] ABSTRACT

The overall mass transport efficiency of hollow fiber membrane separation cells is increased by introducing segmented flow into the bores of the fibers. The invention is preferably practiced by dispersing a gas segmentation phase into a continuous liquid phase and feeding the dispersion into the bores of the fibers to form alternating flowing segments of gas and liquid.

5 Claims, 2 Drawing Sheets

APPARATUS FOR MEMBRANE-PERMEATION SEPARATIONS USING SEGMENTED FLOW

This is a continuation of application Ser. No. 043,512, filed Apr. 28, 1987, now abandoned, which, in turn is a division of Ser. No. 764,268, filed Aug. 9, 1985, now U.S. Pat. No. 4,684,470.

FIELD OF THE INVENTION

The invention relates to membrane separation method and apparatus wherein liquid containing a separable component is partitioned from a receiving space by a plurality of continuously hollow, selectively permeable membranes, and the separable component selectively passed across the membranes and removed through the receiving space. More particularly, the invention relates to decreasing concentration polarization adjacent the boundary between the liquid phase and inaer surfaces of the hollow membranes to increase the overall rate of mass transport of the separable component across the membrane walls.

BACKGROUND OF THE INVENTION

Compact membrane separation cells were developed in the 1960's based on bundling together fine strands of continuously hollow fibers. The design of this type of a separation cell shown in U.S. Pat. No. 3,228,876 employs from between 10 to one million or more hollow fiber strands having their end portions secured in tube sheet with the central portion of the fiber bundle exposed within the cell to facilitate membrane transport between the bores of the fibers and the interior space of the cell. Permeation separations are carried out with these units by feeding liquid through the multiple channels formed by the fiber bores with permeation occurring into the interior of the cell as the liquid simultaneously flows through the fiber bundle; or a feed liquid (or feed gas) may be contacted with the outer surfaces of the fibers, while a receiving liquid is passed through the bores of the fiber bundle. The permeable separable component is thus removed from the separation cell dispersed in the receiving liquid.

These separation cells are designed for relatively easy fabrication, and advantageously permit a maximum exposure of membrane surface area to the feed stream. The referenced patent claims as much as 10,000 square feet (10,000 ft²) of membrane surface area may be exposed for permeation transfer per cubic foot of volume occupied.

The small tube or fiber bore sizes necessarily used in these units to maximize membrane surface area, however, produce detrimental laminar flow conditions in which an effectively stagnant layer of liquid film develops that is next to the inner wall of the fiber. There is little or no convective mixing in this layer, and thus the permeable component m.voes across the stagnant boundary layer only by the relatively slow diffusion process. A resistance to transport can thus develop which retards the rate of mass transport of permeable component across the membrane apart from the resistance of the membrane itself. This effect is generally described as concentration polarization.

With efficient membranes, concentration polarization frequently becomes the rate limiting step in membrane transport. In such cases, improvements in membrane performance, such as by using thinner active membranes, leads to little or no gain in improving the efficiency of the separation cell.

Skilled practitioners concerned with improving the separation cell design of U.S. Pat. No. 3,228,876 to reduce concentration polarization have generally proposed a mechanical solution similar to the mechanical turbulence promoters having known effectiveness for membrane separations broadly. For example, external deformations of the fiber bundle or individual fibers has been frequently proposed (e.g., U.S. Pat. Nos. 3,963,622; 4,219,426 and 3,989,626). These designs, however, are not known to be commercially used, and are believed to produce only nominal improvements.

Packing the bore of small tubes with, e.g., spheres, has been recently developed for analytical chromatography and has been shown to be effective in reducing concentration polarization (Anal. Chem., Vol. 54, No. 7, pp. 1206–1208, 1982). However, the fabrication difficulty imposed by packing the individual fibers and the much higher back pressures produced make this technology impractical for large scale separations of process fluids.

TERMS

"Segmented flow" means flow through continuously hollow membranes of alternating segments of a liquid phase and a segmentation phase.

"Segmentation fluid" means a gas or liquid which when dispersed in a liquid phase is effective to produce beneficial segmented flow.

"Feed stream" means a feed liquid or gas containing one or more separable components which may be separated to varying degrees of purity by contacting the feed stread with a selectively permeable membrane under conditions effective to preferentially permeate the separable component across the membrane wall.

"Receiving liquid" means a liquid contacting the membrane on the surface opposite the feed stream.

"Permeation" means and refers to any form of membrane permeation detrimentally affected by concentration polarization, including without limitation, the specific permeation processes of dialysis, microfiltration, ultrafiltration, reverse osmosis, electro-dialysis, membrane distillation, and pervaporation.

"Mass transport" means the mass, e.g., in terms of kilograms or pounds, recovered following permeation across a membrane or membranes in a unit of time.

"Hollow fibers" mean small elongate membrane tubes having internal diameters of about 1,000 microns or less.

SUMMARY OF THE INVENTION

The invention concerns separation methods and apparatus employing separation cells composed of a plurality of continuously hollow, elongate membranes in which the overall mass transport across the membranes is effectively increased by introducing segmented flow into the bores or flow channels of,the membranes. The increase in overall mass transport achieved by implementing the invention had been found to be generally comparable to that obtained by the new technology of packing small tube membranes with spheres, but without the complication of introducing high back pressures, or creating separation cells of great difficulty to fabricate inexpensively.

More specifically, the invention relates to membrane separation apparatus generally including a separation cell having a liquid inlet means and liquid outlet means, the separation cell having an internal space partitioned from the liquid inlet means and outlet means by the walls of a plurality of continuously hollow, selectively permeable membranes, the membranes being positioned within the cell and defining multiple elongate flow channels which are in fluid communication between the liquid inlet means and liquid outlet means, the improvement which comprises: a means for modifying the liquid fed to the flow channels by dispersing therein a fluid segmentation phase effective to produce beneficial segmented flow of liquid phase/segmentation phase in the multiple flow channels defined by the membranes, said membranes having flow channels capable of sustaining segmented flow, and the membranes being capable of yielding increased overall mass transport of a permeable component through the walls of the membranes in combination with segmented flow produced by the dispersion means.

Yet another aspect of the invention relates to a method of increasing overall mass transport of a permeable component of a flowable stream through the walls of a plurality of elongate, continuously hollow membranes which are preferentially permeable to a component of the stream, in relation to other components thereof, said method comprising:

(a) introducing a flowable stream of a feed liquid capable of segmente flow into multiple flow channels formed by a plurality of elongate, continuously hollow membranes capable of sustaining segmented flow;

(b) introducing a fluid segmentation phase into the flow channels of the membranes effective to, produce segmented flow beneficial to increasing the overall mass transport of a permeable component of the feed stream through the walls of the membranes;

(c) using membranes which over a range of flow rates effectively yield increased mass transport of the permeable component in response to segmented flow produced by step (b);

(d) maintaining the flow rate within a range which yields increased overall mass transport of the permeable component through the walls of the membranes through combined steps (b) and (c); and (e) dispersing the permeated component away from the outer wall surfaces of the membranes at a sufficient rate to maintain a rate of increased overall mass transport achieved by steps (b)-(d).

Still another aspect of the invention is the method of reducing concentration polarization on the receiving side of the membrane. This method coprises the steps of:

(a) introducing a flowable receiving stream of liquid capable of segmented flow into multiple flow channels formed by a plurality of elongate, continuously hollow membranes capable of sustaining segmented flow;

(b) contacting the outer wall surfaces of the membranes with a feed stream containing a component preferentially permeable through the walls of the membranes;

(c) introducing a fluid segmentation phase into the flow channels of the hollow membranes effective to produce segmented flow beneficial to increasing the overall mass transport of the permeable component of the feed stream through the walls of the membranes; and (d) using membranes which, under the conditions of the method, effectively yield increased overall mass transport of the permeable component into the receiving stream in response to step (c).

THE DRAWING

Yet further aspects and advantages of the invention will in part be pointed out in, and in part apparent from, the following more detailed description considered together with the accompanying drawing, in which.

DETAILED DESCRIPTION OF THE INVENTION

Figure 2:
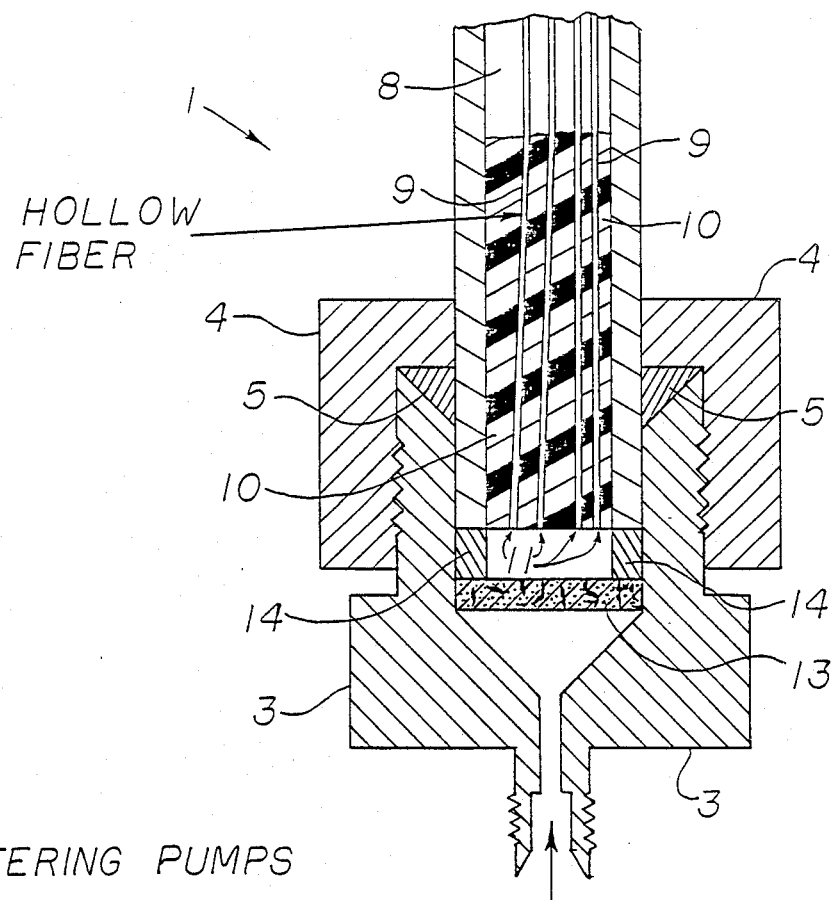
FIG. 2 is an enlarged partial view in cross section showing the separation cell used in the FIG. 1 apparatus.
Figure 1:
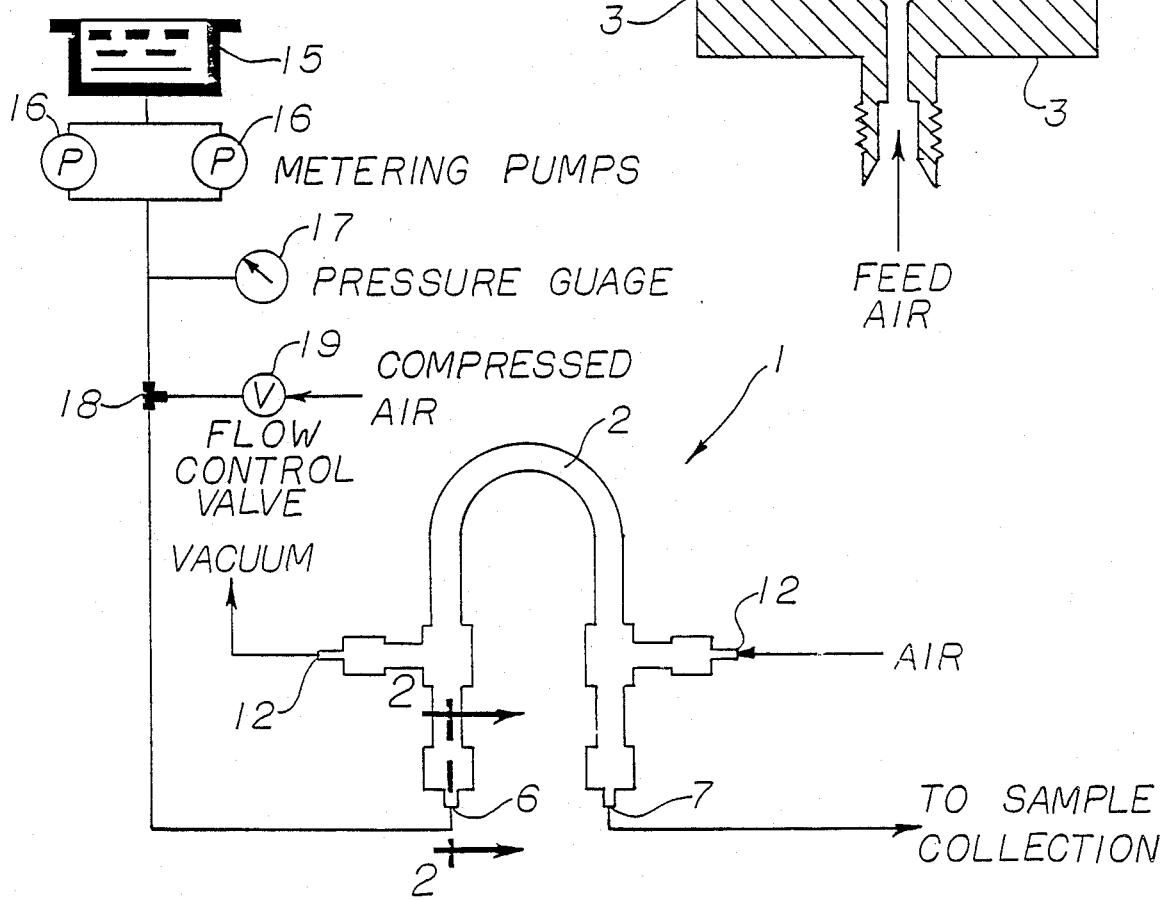
FIG. 1 is an elevational view of apparatus for membrane permeation separations constructed to beneficially use segmented flow.

A membrane separation cell 1 is shown in FIGS. 1 and 2 which is basically of the tube and shell design described in U.S. Pat. No. 3,228,876 except for modifications made for purposes of operating the cell using segmented flow. The design shown includes a housing 2 made of, e.g., stainless steel tubing. A threaded union 3 is affixed to opposite terminal end portions of the tubing and is conventionally secured using a nut and ferrule 4, 5. The unions provide a liquid inlet means 6 and a liquid outlet means 7.

The separation cell has an internal space 8 partitioned from the liquid inlet means and liquid outlet means by the selectively permeable walls of a plurality of continuously hollow, elongate membranes 9 contained within cell 1. The membranes have their opposite terminal end portions potted in tub sheeting material 10 to form continuous, elongate flow channels 11 in fluid communication between the liquid inlet means 6 and liquid outlet means 7. The housing 2 conventionally includes one or more openings 12 for contacting the outer surfaces of the membranes with a liquid or gas, and/or for controlling the pressure within space 8. It is conventional to place turbulence promoters within space 8 in order to minimize concentration polarization adjacent the outer surfaces of the membranes (see U.S. Pat. No. 3,503,515).

The invention particularly concerns reducing or eliminating concentration polarization within the elongate flow channels 11 along the inner wall surfaces of membranes 9. This is accomplished by modifying the liquid fed to the flow channels by dispersing therein a fluid segmentation phase in a form effective to produce beneficial segmented flow. This modification of the liquid may be accomplished using varied methods, but a preferred means is to use a frit 13 of an appropriate and effective pore size to produce segmented flow. Desirably a spacer 14 is seated between the frit and the potted inlet end of membranes 9 in order to promote formation of a generally homogenous dispersion of segmentation phase in a continuous liquid phase for feed into the flow channels.

The apparatus used for delivery of feed liquid or receiving liquid to the separation cell is conventional except for modifications to effectively introduce segmentation phase into the cell. A typical system comprises a source for the liquid such as reservoir 15 shown in FIG. 1, controlled pumping means 16 for advancing liquid from the reservoir, and a pressure metering gauge 17. These elements are connected through suitable conduit means to a tee 18 having connection to a flow control valve 19. Segmentation phase is added through valve 19 and tee 18 to the liquid stream; and the combined streams are ultimately added to separation cell 1. Alternatively, the segmentation phase can be separately routed to the cell.

In one aspect of the invention feed liquid such as from reservoir 15 is passed at a controlled flow rate and pressure to separation cell 1, and a segmentation phase added at a controlled flow rate and pressure through valve 19. The combined streams enter the liquid inlet means 6 and are passed through frit 13 dispersing the segmentation phase as small gas bubbles in continuous liquid phase comprising the feed liquid. Alternatively, a liquid segmentation phase may be used but is less preferred.

Figure 3:
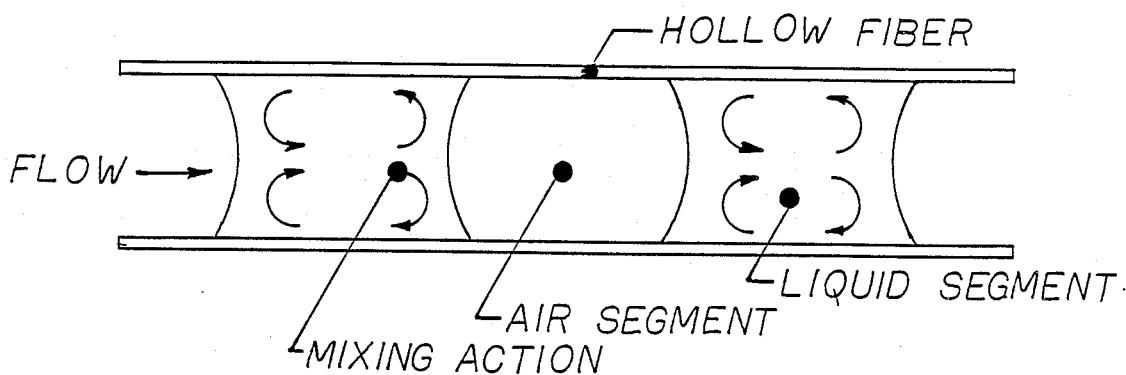
FIG. 3 illustrates segmented flow within the bore of a tubular membrane.

The modified liquid feed is then introduced into flow channels 11 with the dispersed gas bubbles forming alternating liquid segments and gas segments as shown in FIG. 3. The arrows indicate the convective mixing produced in each liquid segment effective to reduce or eliminate detrimental concentration polarization along the inner wall surfaces of the membranes. This mixing increases overall mass transport of permeable component through the membrane walls with minimal increase in back pressure applied to the membranes.

Membranes are used in separation cell 1 of an efficiency which yield increased overall mass transport of the permeable component in response to segmented flow at least over a range of flow rates; and the flow rate is controlled within the range which yields the beneficial results. The permeable component is dispersed away from the outer surfaces of membranes 9 at a rate which avoids concentration polarization adjacent the outer surfaces of the membranes. This is accomplished, where necessary, e.g., by drawing a vacuum on space 8 or by adding to space 8 a receiving fluid stream which continually sweeps space 8.

In an alternative form of using cell 1, a feed gas or liquid is added to space 8 through openings 12, causing contact between the feed stream and outer wall surfaces of the membranes. The separable permeable component is ultimately dispersed through the membrane walls into a segmented receiving liquid produced in flow channels 11 through the means recited previously.

BROADENING ASPECTS OF THE APPARATUS AND METHODS OF THE DETAILED DESCRIPTION

Membranes useful in the invention are selected from those available to the art, e.g., on the basis of what is customarily used in the various "permeation" processes listed above. The membrane used are limited to those capable of supporting segmented flow, and having efficiencies relative to a given permeation separation to be beneficially improved by means of practice of the invention. However, as shown in teaching Example 2, the overall mass transport through even a relatively inefficient membrane can be significantly improved by segmented flow. Thus a relatively broad scope of membranes may be considered for use in practicing the invention. The form of the membrane need not be strictly limited to seamless hollow fibers, but functionally equivalent membrane forms can be used which support and are benefited by segmented flow.

The frit element is considered only exemplary of a means useful for developing segmented flow. Functionally equivalent dispersions could be produced by the use of tubes or gas jets, fine screens, impellers, or combinations of these and other elements. The batch preparation of dispersions of stable segmentation phase in liquid phase may also be considered in place of in-line formations of these dispersions.

The segmentation phase is preferably an inexpensive gas or gas mixture, most preferably air. Thin film coatings which form on the surfaces of the membranes of a receiving or feed liquid, or prepared coatings, may be considered useful or inherently beneficially to assist adequate retention of the gas segments within the membranes. Permeation separation process variables known to be effective in reducing gas permeation rates generally may also be considered and applied for purposes of reducing detrimental permeation losses of the gas segmentation phase.

A liquid segmentation phase e.g., of a polar or nonpolar liquid, is also considered applicable to the practice of the invention. A polar liquid segmentation phase could include water for use with nonpolar organic liquids. A nonpolar organic segmentation phase such as mineral oil may be considered for beneficial use with aqueous feed liquids and receiving liquids.

The invention may be used as a part of a chemical reaction process wherein a reactive chemical component is separated from undesirable components by selective permeation through the membrane walls into a chemically reactive receiving fluid for purposes of reaction with the receiving fluid or components of the receiving fluid. The segmentation phase may include additives or comprise a gas or liquid beneficial to the chemical reaction, in addition to its function of promoting increased overall mass transport of permeable component into the reaction stream.

The invention does not necessarily claim that mass transport is increased in each progressive portion or segment of the continuously hollow membranes, but that offsetting effects or possibly detrimental effects to mass transfer may typically occur in the initial portions of the membranes. However, it is demonstrated through the several examples presented below that significant increases in the overall mass transport of permeable component across the membranes can be typically achieved by use of the apparatus and methods of the invention.

EXAMPLE 1 - ION EXCHANGE REMOVAL OF SODIUM FROM WATER

The apparatus used in this experiment is a modified Dionex Model 10 Ion Chromatograph. A commercial Dionex hollow fiber suppressor (unpacked) is used as the separation cell (Dionex Corp., 1228 Titan Way, Sunnyvale, CA). Segmented flow is generated, when desired, by means of a Whitey Model SS-S-1SG flow control valve (Whitey Co., Highland Heights, OH) which is used, to meter compressed air into a feed liquid of $Na_2CO_3$ by means of a Dionex 1/16 inch tee, and Dionex 1/16 inch O.D., 0.030 inch I.D. Teflon ® tubing. No frit is necessary since the commercial suppressor uses a single hollow fiber membrane of 5 feet of Nafion ® 811-X ion exchange tubing in a tube and shell configuration. Thus, individual gas bubble segments can be successfully injected directly into the tubing leading to the suppressor device.

The purpose of the hollow fiber suppressor in ion chromatography is to convert highly conducting $Na_2CO_3$ solution within the bore of the fiber to weakly conducting $H_2CO_3$ by ion-exchange of $Na^+$ ions for $H^+$ ions obtained by contacting the outer surface of the hollow fiber with dilute sulfuric acid (for details see U.S. Pat. No. 4,474,664). As the flow rate of the Na$_2$CO$_3$ feed liquid is reduced in steps starting at 200 mL/hr, the conductivity of the effluent of the suppressor is reduced due to greater conversion of the carbonates to carbonic acid. At some reduced flow rate, there is no further reduction of conductivity due to essentially complete conversion. At an even more reduced flow rate there is a small increase in conductivity due to slight Donnan prohibited diffusion of sulfuric acid across the membrane into the feed liquid. The flow rate where conductivity is a minimum is termed the "maximum flow rate" of the system. In the experiments with segmented flow, the compressed air flow control valve is adjusted so that the air and feed segments within the hollow fiber membrane are each about 5 mm long. Table I lists the resulting data using this system.

TABLE I

EFFECT OF SEGMENTED FLOW WITH A HOLLOW FIBER SUPPRESSOR FOR ION CHROMATOGRAPHY

| Segmented Flow | Maximum Flow Rate of the System | Eluent Pressure |
|---|---|---|
| No | 40 mL/hr | 2 psig |
| Yes | 160 mL/hr | 18 psig |

The data in Table I indicate that segmented flow allows a 4 fold increase in feed stream flow with about a 9 fold increase in back pressure. For comparable non-segmented flow of 160 mL/hr, back pressure is 9 psig. Interestingly, both segmented flow and the previous use of spheres as a turbulence promoter resulted in the same maximum flow rate with essentially complete suppression using the identical separation cell and apparatus.

EXAMPLE 2 - ION-EXCHANGE REMOVAL OF POTASSIUM FROM GLYCOL ETHER

The apparatus used in this experiment is similar to that of the previous example, except employing a modified separation cell. This consisted of 2 feet of Nafion ® 815-X ion exchange membrane tubing suspended in a stirred solution of 250 mL of 0.1N H SO$_4$.

This form of separation cell was evaluated for the ion-exchange removal of potassium ion from a mixed isomer glycol ether with and without segmented flow. When segmented flow was used, the compressed air flow control valve was adjusted so that the air and liquid segments were each about 10 mm long. Potassium was determined in the collected samples by atomic absorption spectroscopy. Table II lists the resulting data.

TABLE II

EFFECT OF SEGMENTED FLOW ON THE ION-EXCHANGE REMOVAL OF POTASSIUM ION FROM GLYCOL ETHER

| Feed, Glycol Ether Containing 600 ppm Potassium Ion. Feed Flow Rate | Potassium Removed Using: | |
|---|---|---|
| | Segmented Flow | Non-Segmented Flow |
| 1 mL/min | 77 | 57 |
| 2 mL/min | 55 | 55 |
| 4 mL/min | 47 | 55 |

The data in Table II indicate segmented flow improved performance at a feed flow rate of 1 mL/min, showed no improvement at 2 mL/min, and reduced performance at 4 mL/min. The explanation offered for these results is that at 4 mL/min flow rate the overall resistance to mass transport of potassium ion was membrane and not bulk solution limited. Thus, the reduced residence time in the hollow fiber with segmented flow (a linear velocity increase of about 2 fold at any given feed flow rate) and/or the loss of effective membrane area due to the air segments, resulted in a slightly reduced performance. At a feed flow rate of 1 mL/min, the overall resistance to mass transport was bulk solution and not membrane limited (especially near the end of the hollow fiber), and the mixing generated in the liquid segments decreased concentration polarization on the feed side of the membrane so effectively that overall performance was better with segmented flow. At a feed flow rate of 2 mL/min, the benefits of segmented flow were approximately offset by the reduced effective membrane area and reduced residence time in the hollow fiber.

EXAMPLE 3 - PERVAPORATION REMOVAL OF TOLUENE FROM WATER

The preceding Examples are considered useful in controlled studies to determine the effects of process variables on individual fibers with minimal complication.

This Example shows the same beneficial effects may be produced using a multi-fiber separation cell comprising 30 strands of 300 $\mu$m I.D.×600 $\mu$m O.D. silicone rubber fibers, each of about 0.5 m in length; and having their terminal end portions potted in epoxy resin tube sheeting. These membranes are sold under the brand name Silastic ® by Dow Corning Corp., Midland, 7 MI Segmented flow is produced using a 15 $\mu$m porosity stainless steel frit. All conduits are 1/16 inch O.D. ×0.030 inch I.D. stainless steel tubing.

This separation cell and the apparatus as shown in FIG. 1 is evaluated for the pervaporation removal of toluene from water with and without segmented flow. In these experiments, the volume of segmentation air is measured at atmospheric pressure at the sample collection point by letting it bubble into a graduated cylinder filled with water and inverted into a beaker of water. Toluene is determined in the collected samples by UV spectrophotometry. Table III lists the results.

TABLE III

EFFECT OF SEGMENTED FLOW ON THE PERVAPORATION REMOVAL OF TOLUENE FROM WATER

| Feed, 100 ppm Toluene in Water. Feed Flow Rate, mL/hr | Segmentation Air Flow Rate, mL/hr | Feed Pressure psig | Percent Toluene Removed |
|---|---|---|---|
| 115 | 0 | 3 | 98 |
| 230 | 0 | 5 | 95 |
| 460 | 0 | 9 | 86 |
| 920 | 0 | 22 | 70 |
| 460 | 170 | 11 | 88 |
| 460 | 830 | 18 | 97 |
| 460 | 2400 | 22 | 94 |
| 460 | 5800 | 48 | 91 |
| 920 | 690 | 24 | 87 |
| 920 | 1100 | 28 | 91 |
| 920 | 1900 | 33 | 91 |

Figure 4:
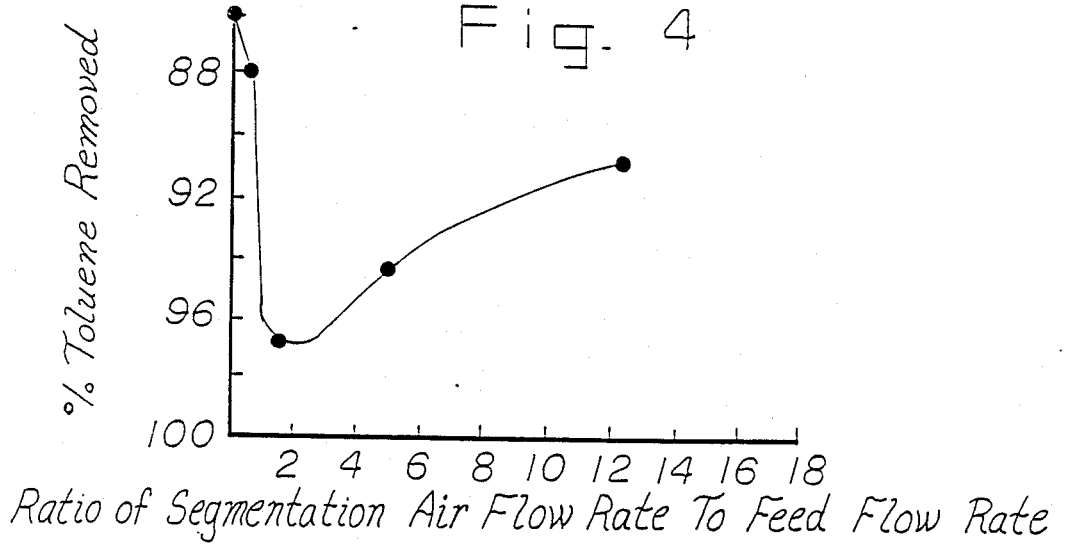
FIGS. 4 and 5 are graphs of plotted data developed in connection with teaching Example 3.

The data in Table III indicate that the ratio of segmentation air flow rate to feed flow rate affected performance as shown in the data plot of FIG. 4.

The data in FIG. 4 indicate an optimum ratio of about 2. Since the feed pressure was about 18 psig at a ratio of 2, the ratio of gas to liquid volume at the inlet end of the hollow fibers was about 1:1 and grew to 2:1 at the outlet. At a ratio of 0.37, there was apparently not enough segmentation generated. At ratios of 5.2 and especially 12.7, reduced performance is attributed to decreased residence time in the unit.

Figure 5:
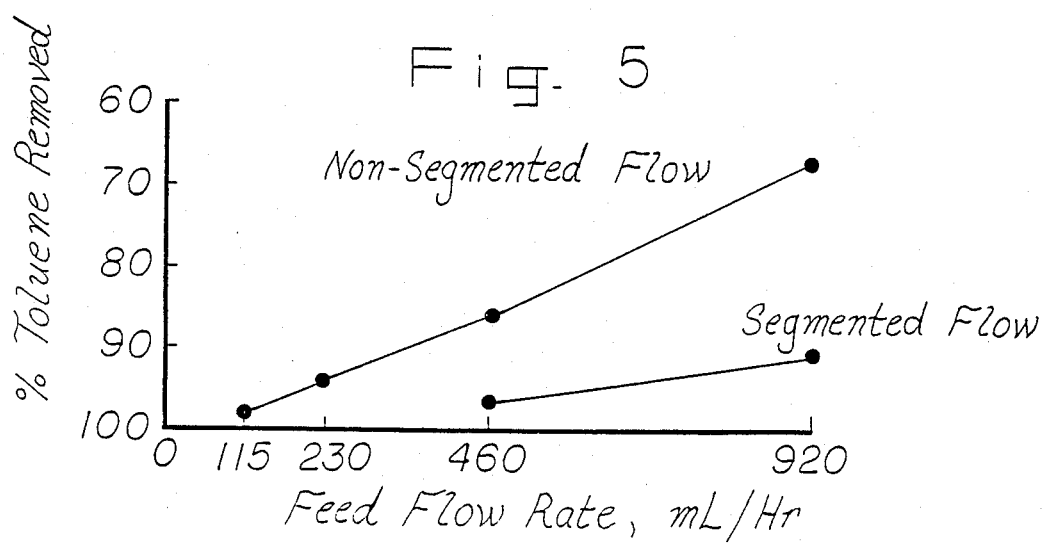

FIG. 5 is a plot of the data in Table III for segmentation air to feed flow rate ratios of about 2:1. The data in FIG. 5 indicate that with segmented flow an increase of feed flow rate of 2.8 fold and 2.6 fold, respectively, is allowable at a performance level of 90 percent and 95 percent toluene removal. This level of performance improvement is the same as when the identical hollow fibers were packed with 250 μm spheres.

STATEMENT OF INTENT

The inventors hereby state their intent to rely on the Doctrine of Equivalents to determine and assess the reasonably fair scope of their invention as pertains to any apparatus and method not materially departing from but outside the literal scope of the invention as set out in the following claims.

What is claimed is:

1. A membrane separation apparatus comprising a separation cell having a liquid inlet mean and liquid outlet means, the separation cell having an internal space partitioned from the liquid inlet means and liquid outlet means by walls of a plurality of continously hollow, selectively permeable membranes, the membranes being positioned within the cell and defining multiple parallel alongate flow channels which are in fluid communication between the liquid inlet means and the liquid outlet means, the improvement which comprises: a source of a liquid feed to the flow channels through the inlet means, a source of a segmentation phase, the segmentation phase immiscible with the liquid feed, a means for dispersing the segmentation phase in the liquid feed effective to produce benificial segmented flow of alternating segments of liquid feed and segmentations phase in the multiple flow channels defined by the membranes, the membranes having flow channels capable of sustaining segmented flow, and the membranes being capable of yeilding increased overall mass transport of a permeable component through the walls of the membranes in combination with the segmented flow.

2. The apparatus of claim 1 wherein the membranes comprise a plurality of elongate, tubular membranes.

3. The apparatus of claim 1 wherein the means for ispersing the segmentaion phase in the liquid feed comprises a means for dispersing a gas in a liquid to form a dispersion of discontinuous gas segmentation phase in a continuous phase of the liquid feed.

4. The apparatus of claims 1 or 3 comprising a separation cell having ten or more hollow fiber membranes.

5. The apparatus of claim 4 wherein the means for dispersing the segmentation phase in the liquid feed comprises a porous frit.

* * * * *

UNITED STATES PATENT AND TRADEMARK OFFICE
CERTIFICATE OF CORRECTION

PATENT NO. : 4,834,877

DATED : May 30, 1989

INVENTOR(S) : Thomas L. Peters; Timothy S. Stevens

It is certified that error appears in the above-identified patent and that said Letters Patent is hereby corrected as shown below:

Col. 1, line 20, delete "inaer" and insert --inner--.
Col. 1, line 58, delete "m.voes" and insert --moves--.
Col. 2, line 58, after "of" delete the comma (,).
Col. 3, line 13, after "of" delete the period (.).
Col. 3, line 27, delete "segmente" and insert --segmented--.
Col. 3, line 31, after "to" delete the comma (,).
Col. 3, line 49, delete "coprises" and insert --comprises--.
Col. 6, line 55, after "used" delete the comma (,).
Col. 7, line 41, delete "H SO$_4$" and insert --H$_2$SO$_4$--.
Col. 7, Table II, Columns entitled "Potassium Removed Using:", before the word "Potassium" insert --%--.
Col. 8, line 25, after "μm", second occurrence, delete the numeral "0" and insert the letter --O--.
Col. 8, line 30, after "Midland," delete "7".
Col. 8, line 32, after "inch" delete the numeral "0" and insert the letter --O--.
Col. 9, Claim 1, line 22, delete "mean" and insert --means--.
Col. 9, Claim 1, line 28, delete "alongate" and insert --elongate--.
Col. 10, Claim 1, line 8, delete "segmentations" and insert --segmentation--.
Col. 10, Claim 1, line 12, delete "yeilding" and insert --yielding--.
Col. 10, Claim 3, line 18, delete "ispersing" and insert --dispersing--.

Signed and Sealed this

Fifteenth Day of May, 1990

Attest:

HARRY F. MANBECK, JR.

*Attesting Officer*  *Commissioner of Patents and Trademarks*